United States Patent [19]

Kuwashima

[11] Patent Number: 5,342,523

[45] Date of Patent: Aug. 30, 1994

[54] MISCELLANEOUS DRAIN WATER PURIFYING METHOD AND MISCELLANEOUS DRAIN WATER PRUIFYING DEVICE

[76] Inventor: Hiroshi Kuwashima, 543-5,Ooaza Amori, Nagano-shi, Nagano-ken, Japan

[21] Appl. No.: 43,834

[22] Filed: Apr. 6, 1993

[30] Foreign Application Priority Data

Apr. 11, 1992 [JP] Japan .................................. 4-117921

[51] Int. Cl.$^5$ .............................................. C02F 3/30
[52] U.S. Cl. ..................................... 210/605; 210/607; 210/620; 210/202; 210/253; 210/532.2
[58] Field of Search ............... 210/608, 613, 620, 630, 210/804, 170, 202, 220, 253, 259, 532.1, 532.2, 538, 605, 920

[56] References Cited

U.S. PATENT DOCUMENTS

| | | | |
|---|---|---|---|
| 3,681,236 | 8/1972 | Birgles et al. | 210/605 |
| 3,875,051 | 4/1975 | Kovnik | 210/920 |
| 3,914,164 | 10/1975 | Clark | 210/605 |
| 4,505,813 | 3/1985 | Graves | 210/532.2 |
| 4,664,795 | 5/1987 | Stegalt et al. | 210/532.2 |
| 4,824,572 | 4/1989 | Scott | 210/170 |
| 4,892,658 | 1/1990 | Martin et al. | 210/253 |
| 5,137,636 | 8/1992 | Bundgaard | 210/605 |

*Primary Examiner*—Christopher Upton
*Attorney, Agent, or Firm*—McGlew and Tuttle

[57] ABSTRACT

A method in which a miscellaneous drain water purifying device having a plurality of separator tanks connected to miscellaneous drain water sources via a change valve, receiving miscellaneous drain water, leaving it stagnant, and separating sedimentation and floating substances and a decomposition tank connected to a plurality of the respective separator tanks and receiving flow-out liquid from the sedimentation separator tanks is used, while one of the sedimentation separator tanks receives miscellaneous drain water and carries out sedimentation separation of sludge, sends out the top level clear water in the quantity equal to the received water quantity to the decomposition tank and carries out purifying treatment, an aeration treatment of the sludge separated from miscellaneous drain water by the previous stage prior to transfer is carried out in the other separator tank which is shut off from the miscellaneous drain water sources via the change valve; such transfer is alternatively repeated at suitable intervals.

5 Claims, 5 Drawing Sheets

MISCELLANEOUS DRAIN WATER PURIFYING METHOD AND MISCELLANEOUS DRAIN WATER PRUIFYING DEVICE

FIELD OF THE INVENTION

The present invention relates to a miscellaneous drain water purifying device which is easy to maintain and control, and further, speaking in detail, relates to a disposal device which can deal with miscellaneous drain water purifying treatment in such a large scale as a housing complex and that of general houses, and in which foul water can be purified and discharged into rivers etc.

BACKGROUND OF THE INVENTION

In districts where no sewage system is complete, miscellaneous drain water discharged from each house and restaurant kitchen etc will be directly released under ground. There are put to practical use a variety of types from such simple construction as one in which a box shaped container is divided into two or three communicating chambers arrayed in series by partition barriers. Miscellaneous drain water is passed step by step from the endmost chamber and sediment articles are caused to sediment. The top clear water is released to rivers etc. At the same time periodically, sludge accumulated at the bottom thereof is removed by a vacuum pump, to a combined purifying tank in which night soil and the miscellaneous drain water from kitchens are firstly introduced together to a sedimentation separator tank consisting of a box shaped container. Left stagnant, solid substances are made to sediment and only the top clear flow liquid is transferred to an adjacent aeration decomposition tank equipped with an aeration device. Air bubbles are made to jet, and aerobic bacteria are proliferated, through which decomposition treatment of organic substances is carried out. Next disinfection treatment is carried out in a disinfection tank, and discharge is then made into rivers etc.

THEMES OF PRIOR ARTS

Purifying devices which carry out purifying treatment individually according to each generating source at a location close to the generating source of miscellaneous drain water with no sewage system maintained, or purifying devices where a plurality of miscellaneous drain water generating sources of a specific district are combined and purifying treatment is carried out, have a common problem. Sludge in a sedimentation separation tank has to be removed at regular intervals and the tank interior has to be cleaned.

In other words, in those purifying devices, after a specified period has elapsed, sludge accumulated in the bottom of the sedimentation separation tank and oil etc accumulated in the top level is transferred to an aeration tank, which increases the burden on the aeration tank and lowers the purifying capacity. Therefore, a trained competent qualified person has to carry out checking at specified intervals, remove sludge at specified period intervals in accordance with the state of accumulation of sludge, and clean the interior of the sedimentation separation tank. Failure in these checking, maintenance and control measures may allow foul water, which is not sufficiently purified, to effuse into rivers etc. In order to reduce those risks, there is no other way than to make an aeration tank larger, and in turn it is difficult to install a large-sized purifying device in ordinary homes and small scale restaurants with small site areas. This constitutes one of the reasons it is difficult to install highly reliable purifying devices.

It is therefore a major object of the present invention to provide a miscellaneous drain water purifying device in which removal treatment of sludge will be almost unnecessary, and the number of necessary cycles of cleaning treatment of the inside of a separator tank will be extremely less.

It is another object of the present invention to provide a miscellaneous drain water purifying device which is small-sized and requires only a small area for installation.

It is still another object of the present invention to provide a miscellaneous drain water purifying device which is easily maintained and controlled and for which maintenance and control can be carried out even by somebody other than a person trained and qualified for the purpose.

Other objects of the present invention will become clear from the descriptions hereinafter.

The present invention is characterized in, as the first aim thereof, a miscellaneous drain water purifying method in which a plurality of separator tanks comprising containers having flow inlet ports of miscellaneous drain water generated from home kitchens or bath chambers or restaurant kitchens and a flow outlet port equipped with a flow-out prevention means of floating substances including oil, vegetable refuse, etc are installed in parallel. The respective flow inlet ports of a plurality of these separator tanks are connected through an open/close valve or other flow route changing means to miscellaneous drain water generating sources and at the same time the respective flow outlet ports are connected to a decomposition tank equipped with an aeration device, one of the above mentioned separator tanks is linked to miscellaneous drain water sources and the above mentioned separator tank to receive miscellaneous drain water therein, and the miscellaneous water separated from sediment materials and floating materials in the separator tank is passed to the decomposition tank to carry out purifying treatment, and at the same time another one or more separator tanks is (are) cut off from the above mentioned miscellaneous drain water sources by means of a flow route transfer means, a decomposition treatment process on the sludge and floating substances during the purifying treatment process of the previous stage is carried out in the separator tanks, thereby causing the sludge and floating substances to be subjected to a complete decomposition treatment with a sufficient time taken within the separator tanks.

The present invention relates, as the second aim thereof, to a miscellaneous drain water purifying device which is employed and adopted in the purifying method described in the above mentioned first aim, and comprises a plurality of separator tanks equipped with such sludge decomposition means as an aeration device and an agitating device in a vessel having flow inlet ports of miscellaneous drain water and flow outlet ports equipped with a floating substances flow-out prevention means, wherein the respective flow inlet ports of a plurality of the separator tanks have flow-in routes equipped with an open/close valve and other flow route changing means, and at the same time the respective flow outlet ports of a plurality of the separator tanks are connected to a decomposition tank equipped with an aeration device.

The present invention further relates to, as the third aim thereof, a miscellaneous drain water purifying device equipped with a separator tank connected to miscellaneous drain water sources and receiving miscellaneous drain water from the miscellaneous drain water sources and separating sedimentation substances and floating substances as well as a deposition tank connected to the separator tank and receiving flow-out liquid from the middle layer of the separator tank and carrying out an aeration treatment, wherein sludge decomposition tanks equipped with an aeration device for decomposition of sedimentation sludge decomposition are installed in parallel in the above mentioned separator tank, the sludge decomposition tank is connected to the above mentioned separator tank bottom layer with a pump or other sludge transport means, sludge and floating substances accumulated in the separator tank are transferred to a sludge decomposition tank by a sludge transfer means at specified intervals, and sludge and floating substances are managed to be subjected to a decomposition treatment in the sludge decomposition tank over a sufficient period of time.

Hereinafter, a detailed description is given with reference to preferred embodiments.

DETAILED DESCRIPTION OF PREFERRED EMBODIMENTS

PREFERRED EMBODIMENT 1

Figure 1:
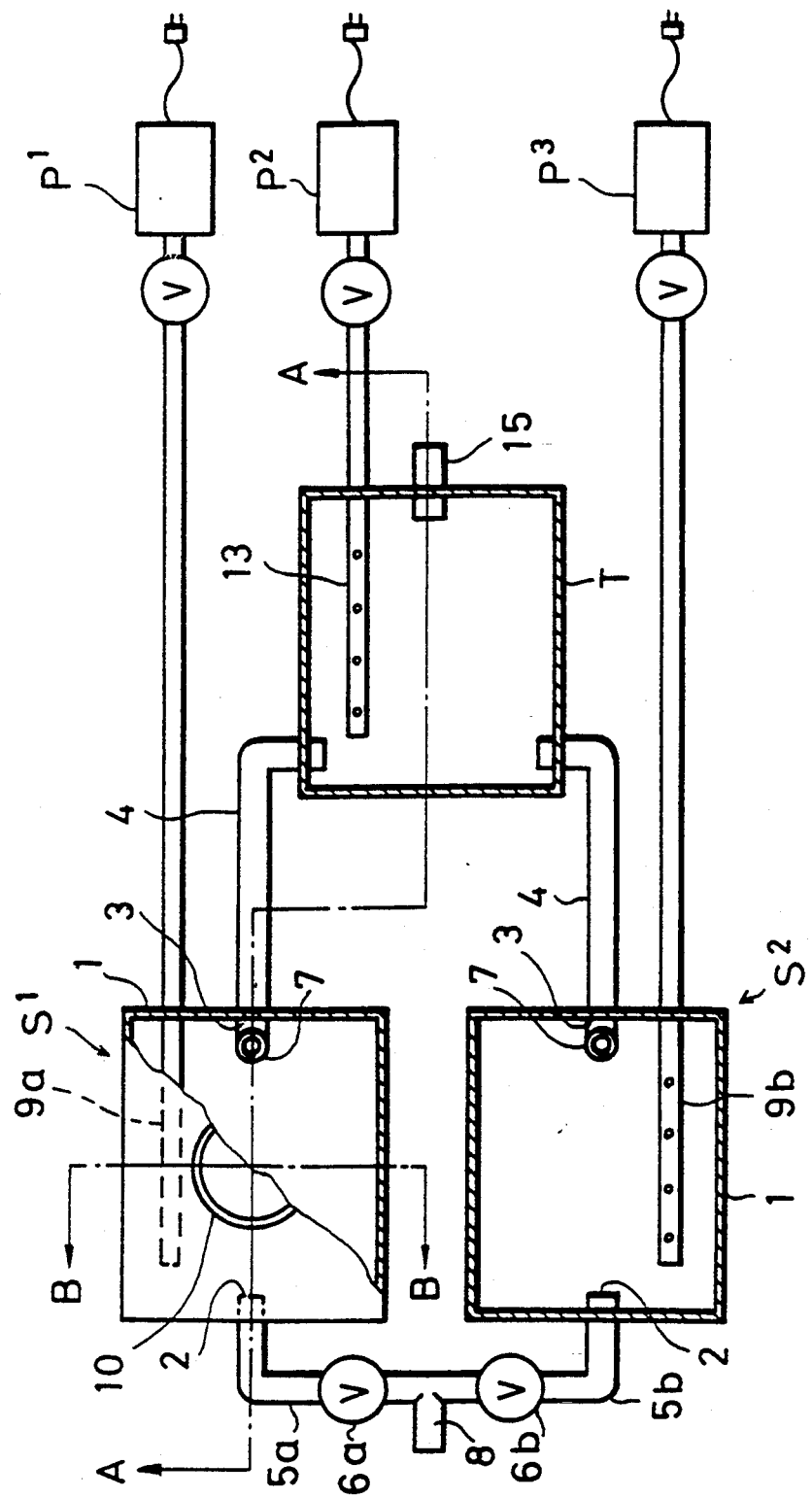
FIG. 1 is a partial cross sectional plan view of the first preferred embodiment according to the present invention.
Figure 2:
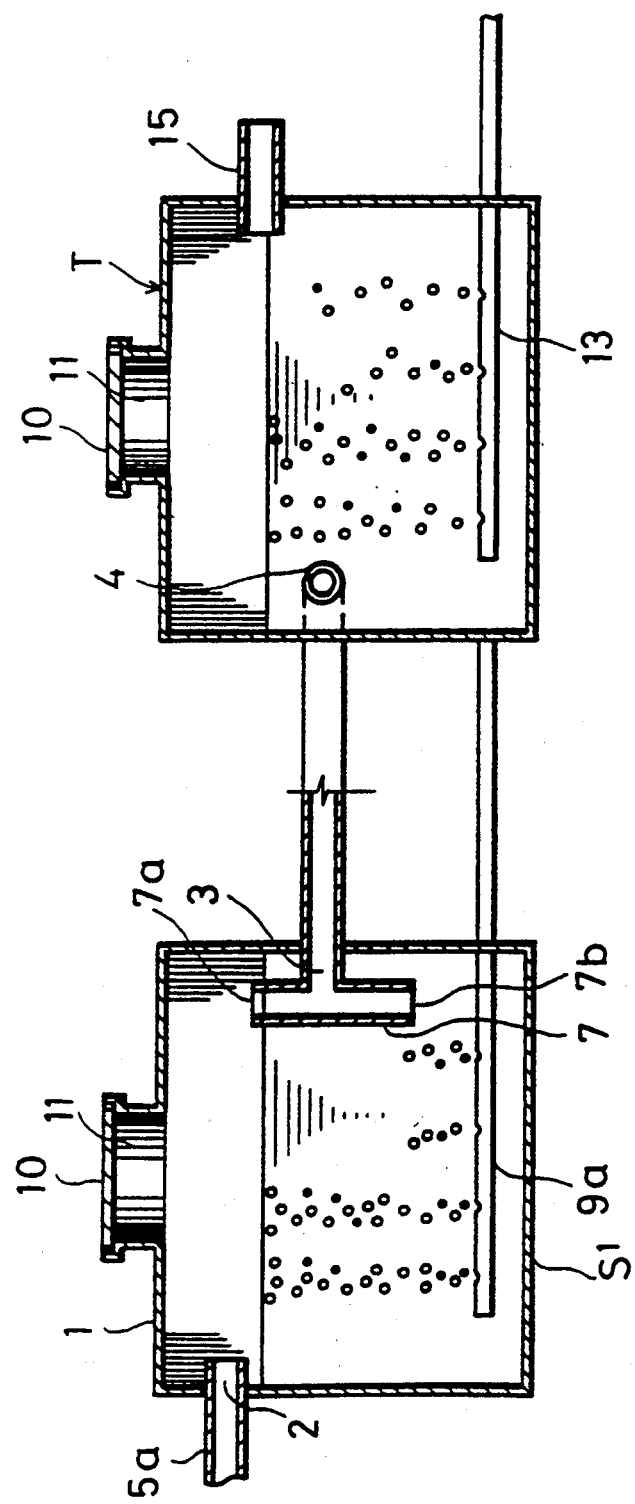
FIG. 2 is a cross section taken along the line A—A in FIG. 1.
Figure 3:
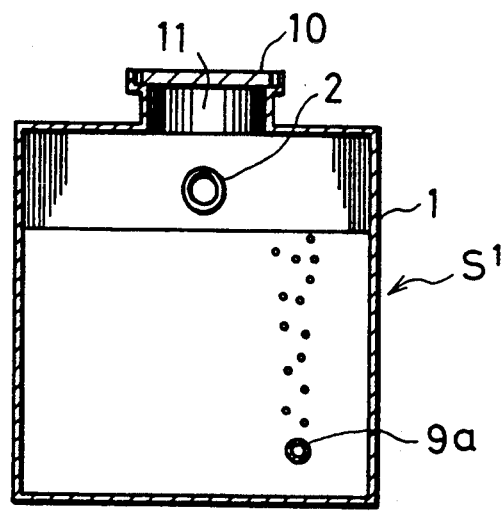
FIG. 3 is a cross section taken along the line B—B in FIG. 1.

FIG. 1 is a partially cut out plan view showing the first preferred embodiment realizing the present invention as a small-scale purifying device for home use. In the device of the present invention, a pair of separator tanks $S^1$, $S^2$ are installed in parallel and have miscellaneous drain water flow inlet ports 2, 2 and flow outlet ports 3, 3 on the side wall of box-shaped vessels 1, 1 made of FRP (fiberglass-reinforced plastic) which have an opening 11 at the upper part thereof. The respective flow outlet ports 3, 3 are connected to a decomposition tank T via flow outlet pipes 4, 4. Flow inlet pipes 5a, 5b connected to the flow inlet ports 2, 2 at one end thereof are connected to a T-shaped pipe 8 and combined together via transfer valves 6a, 6b consisting of open-/close valves, and they are linked to flow outlets of a kitchen and bathroom or other miscellaneous drain water sources. And it is preferable that the covers 10 project from the ground level in these separator tanks $S^1$, $S^2$ and decomposition tank T, and that the rest of body is buried under the ground.

The separator tanks $S^1$, $S^2$ are provided with air jet pipes to jet compressed air transferred from air pumps $p^1$, $p^3$. The air jet tubes 9a, 9b are, for example, pipes made of plastic tubing closed at the tip and provided with many small holes thereat. Numeral 10 represents a cover closing an opening 11. The flow outlets 3 are provided with T-shaped tubular traps 7, 7 as a means to prevent floating substances from flowing-out. Their top tips 7a project from the water level, and the bottom tips 7b open to the middle layer of the water tank. The traps 7, 7 prevent oily substances, vegetable refuse and other floating substances from flowing into the decomposition tank T, and at the same time selectively supply water from the middle layer of the separator tank $S^1$ to the decomposition tank. Numeral 13 represents an air jet pipe installed in the decomposition tank T, and $p^2$ represents its air pump. A flow-out pipe 15 determines the water level of the separator tank $S^1$ and at the same time it serves as a flow route to lead the treated water in the aeration tank T to a disinfection tank etc. The disinfection tank is omitted from the drawing, but it is of the same construction as conventional ones, consisting of a vessel equipped with a device which drips a chloride compound. It may be made separate from the decomposition tank T or the vessel may be divided by a partition wall to form a decomposition tank and disinfection tank.

Action

In the device of the present invention, which is composed as described above, under such a state that one of the change valves 6b is closed and the other change valve 6a remains open. Miscellaneous drain water is made to flow into one of the separator tanks $S^1$, solid substances and floating substances are separated in the separator tank, and liquid in the middle layer, which corresponds to the flow-in quantity flows out of the separator tank $S^1$ and into the decomposition tank T. In the manner as above, while being used for a certain period of time (for example, 6 to 12 months), sludge is accumulated at the separator tank bottom layer, and floating substances are accumulated at the top layer as well.

When such a state has been reached, the change valve 6a is closed, the other change valve 6b is opened, the miscellaneous drain water which flows in from miscellaneous drain water sources is made to dwell in the other separator tank $S^2$. Sedimation substances and floating substances are separated in the separator tank $S^2$ and the middle layer water corresponding to the flow-in quantity is made to flow out to the decomposition tank T. On the other hand, the pump $p^1$ is made to run in the separator tank $S^1$ which is shut off from the miscellaneous drain water sources in order to carry out aeration treatment. Under normal use conditions for houses in general, the separator tank $S^2$ with a cubic capacity of an order of 0.5 to 1 $m^3$ will permit continual service for at least half a year, so that aeration decomposition treatment in the separator tank $S^1$ can be carried out until water in the tank becomes transparent over a sufficient period of time.

As described above, sludge within the separator tank is almost all decomposed by periodically carrying out such changes in the separator tanks at a specified intervals, and removal cleaning treatment of the sludge will not be required at all. In the above mentioned preferred embodiment, a pair of the separator tanks $S^1$, $S^2$ and decomposition tank T are composed of independent vessels and linked by pipes is illustrated. It is also acceptable that the inside of a vessel is divided by partition walls into three chambers, one of the chambers is used as a decomposition tank and the others as separator tanks. Furthermore, in the separator tanks, contact materials consisting of porous pumices, plastic fillers etc may be placed as necessary as proliferation sites for decomposition bacteria. Also, in order to simplify the description, a case where a pair of the separator tanks are used is shown in the preferred embodiment; but, if necessary, three or more units of separator tanks may be obviously employed likewise.

PREFERRED EMBODIMENT 2

Figure 4:
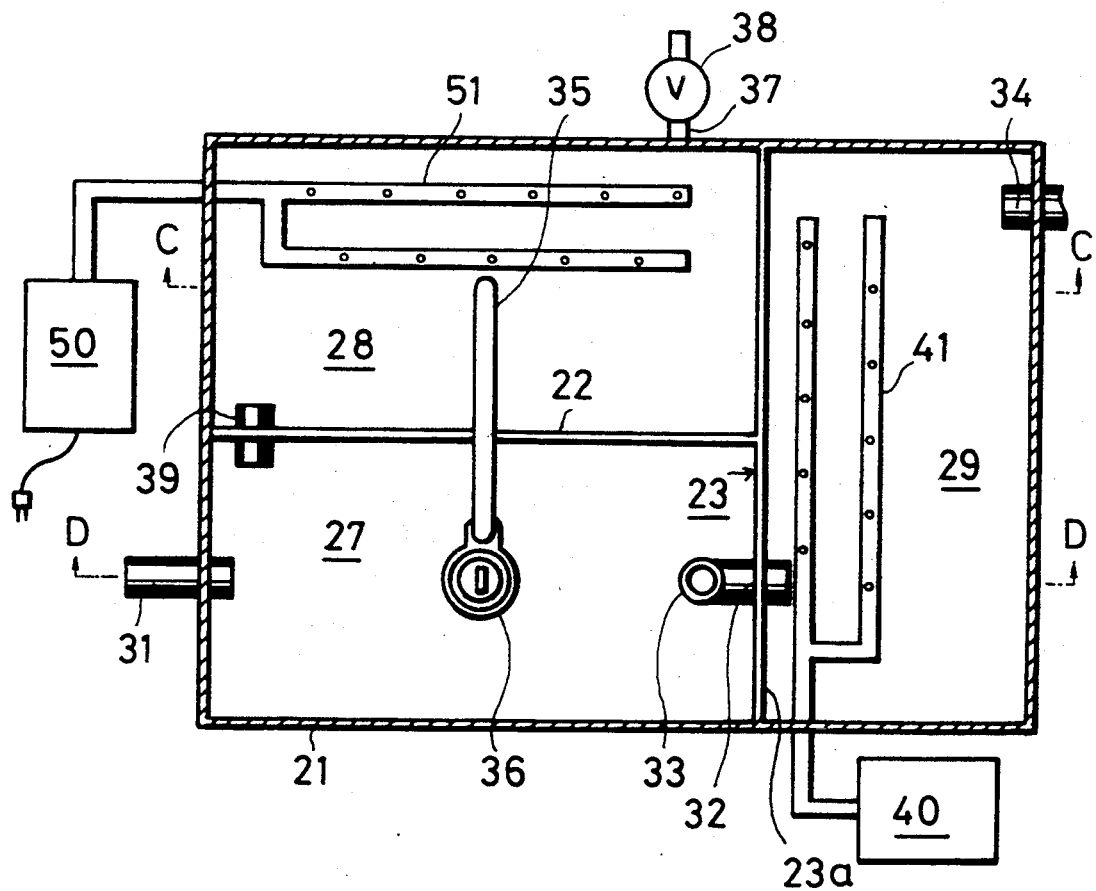
FIG. 4 is a cross sectional plan view of the second preferred embodiment according to the present invention.
Figure 5:
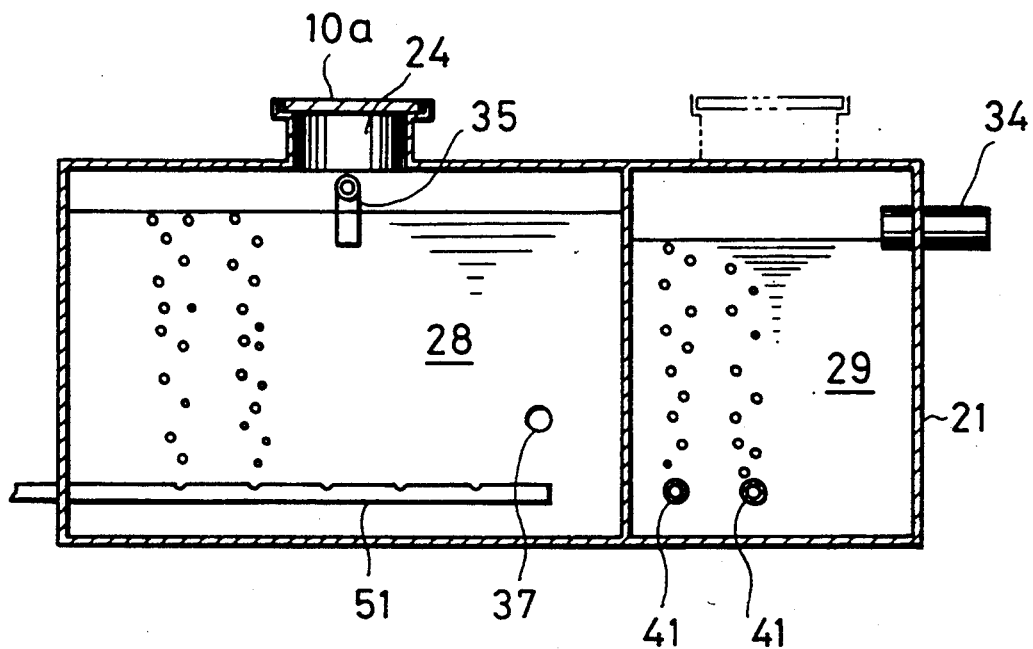
FIG. 5 is an explanatory view taken along the line C—C in FIG. 4.
Figure 6:
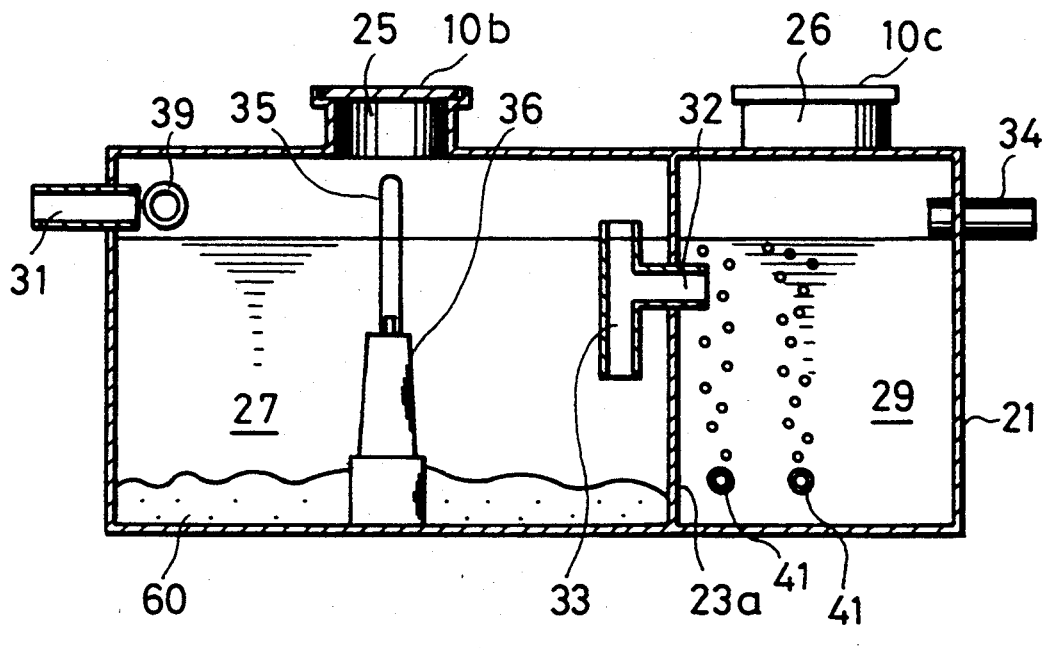
FIG. 6 is an explanatory view taken along the line D—D in FIG. 4.

FIG. 4 is a plan view showing the second preferred embodiment of a purifying device according to the present invention. In FIG. 4, 21 represents a vessel formed to be box shaped with fiberglass reinforced plastic etc. The inside thereof is divided into three chambers by partition walls 22, 23, thereby causing a separator tank 27, a decomposition tank 29 and a sludge decomposition tank 28 to be formed. Cylindrical openings 24, 25 and 26 are provided on the ceiling part of these three chambers, and respectively covers 10a to 10c are set. It is preferable that the vessel 21 is also installed, buried under the ground, excepting the covers 10a to 10c.

A miscellaneous drain water flow inlet port 31 connected to miscellaneous drain water sources is opened into the separator tank 27. A flow outlet port 32 is opened on the partition wall 23a comprising the boundary between the separator tank 27 and the decomposition tank 29. A T-shaped tubular trap 33 is provided on the flow outlet port 32 to inhibit the entry of floating substances into the decomposition tank 29. The decomposition tank 29 is provided with an air jet pipe 41 to send air under pressure from an air pump 40, thereby causing it to serve as an aeration device. Element 34 is a flow outlet pipe for the purpose of making the water, subjected to purifying treatment, move to such other subsequent process tanks as the disinfection tank.

Such a composition of a separator tank and decomposition tank as described above is not different from that of the conventional purifying devices. The device of the present invention is characterized in that the sludge decomposition tank 28 is provided in parallel with the separator tank 27. The sludge decomposition device 28 has an aeration device consisting of an air pump 50 and air jet pipe 51, and is communicated with the sedimentation separator tank 27 via a sludge transport pipe 35. One end of the sludge transport pipe 35 is open to the inside of the sludge decomposition tank, and the other end thereof enters the separator tank 27 beyond the partition wall 22, where it is fitted to a discharge port of the sludge suction pump 36 installed at the bottom of the tank 27. Element 37 is a water discharge pipe communicated to the sludge decomposition tank 28, and is for the purpose of discharging the water inside the sludge decomposition tank 28 to a disinfection tank etc. Element 38 represents an open/close valve, and 39 represents an overflow pipe.

Action

The above mentioned device receives miscellaneous drain water from kitchens, bathrooms, etc in a separator tank, where sedimentation substances and floating substances are separated, water of the middle layer which has less solid substances enters a decomposition tank where the water is subjected to a decomposition purifying treatment through microbes. As described above, when a certain period of time has elapsed, sludge will be accumulated at the bottom of the separator tank. If it remains as it is, the sludge which is whirled upwards in line with the flow-in of miscellaneous drain water will be transferred into the decomposition tank, thereby causing the burden of the decomposition tank to increased, and the purifying device to cease to function normally. Before a state such as the above is reached, the sludge suction pump 36 is made to run at for certain period of time, by which the sludge 60 accumulated in the bottom layer is transferred to the sludge decomposition tank 28 and is subjected to decomposition by aeration treatment.

Normally, as it is good that the transfer of sludge is carried out once every six month to a year, then, sludge decomposition in the sludge decomposition tank can be carried out over a sufficient period of time. Accordingly, sludge with a considerable degree grain size can also be decomposed and treated.

In the above mentioned second preferred embodiment, purified treated water from the sludge decomposition tank was transferred through the water discharge pipe 37 to a tank where the next process is carried out. However, this can also be accomplished by installing a water drain pump whereby the water may be transferred to the separator tank or decomposition tank. Or, the same as in the case of the first preferred embodiment, contact materials may be placed in each tank, and, the separator tank, decomposition tank, sludge decomposition tank may be composed each as an independent tank.

Figure 7:
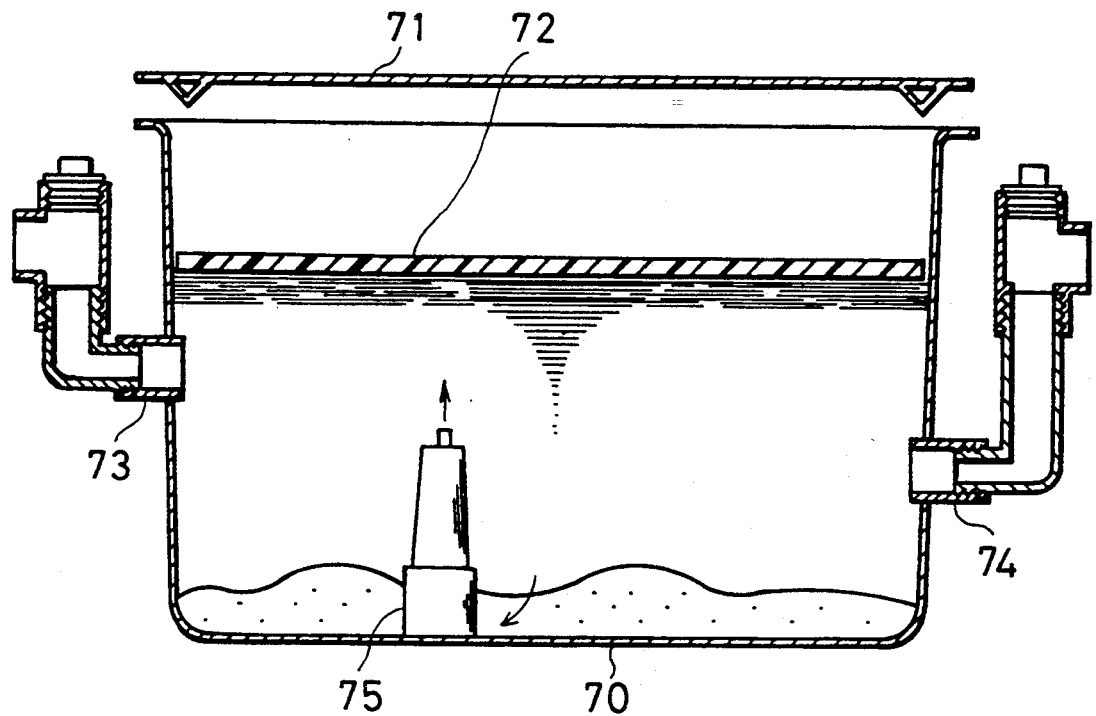
FIG. 7 is a cross section showing another preferred embodiment of a separator tank of the present invention.
Figure 8:
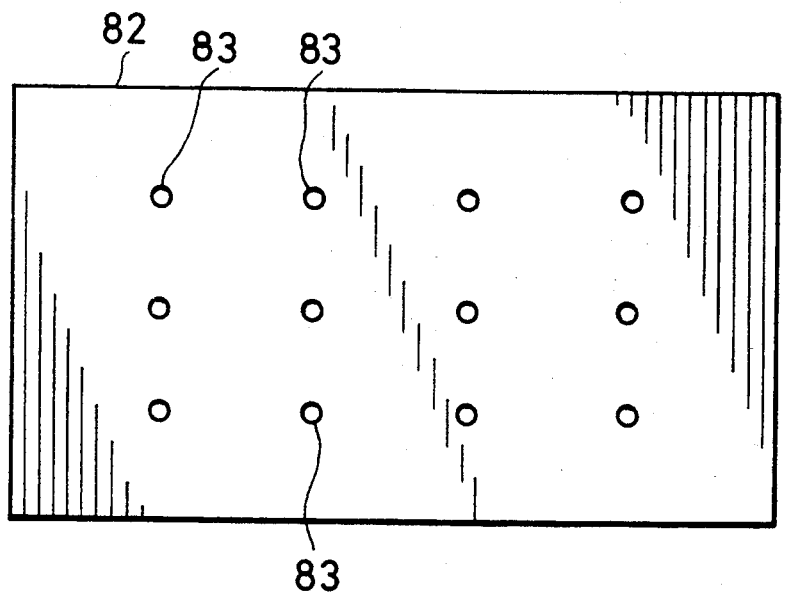
FIG. 8 is a plan view showing another preferred embodiment of an air shut-off body.

In the above mentioned two preferred embodiments, aeration treatment was carried out in a separator tank; but instead of the aeration treatment, or pre- or postaeration treatment, decomposition treatment with aerobic bacteria may be carried out according to the nature of the sludge. Especially, as vegetable oil is a dry oil, decomposition treatment carried out by anaerobic treatment performed by shutting off oxygen supply rather than decomposition by aeration treatment may be much more suitable in some cases. As described above, in the case that miscellaneous drain water includes high oil and fat content or in the case that substances which are rich in nitrogen and phosphor are included therein, then, as shown in FIG. 7, the top face of a box-shaped tank 70 is opened up as a separator tank, and a lid 71 is attached thereto, and one in which an air shut-off body 72 which can fully cover the water surface inside the separator tank is floated may be used. The air shut-off body 72 suffices if it floats on water and is able to shut off air, for example, a plastic film holding air bubbles or a foam plastic board will be suitable. Element 73 represents a miscellaneous drain water flow inlet port, and 74 is a flow outlet port. Agitating blades or an agitator pump 75 etc may be provided in the separator tank in addition to or instead of the aeration device (not shown). In the case that an aeration device is provided, it is preferable that, as shown in FIG. 8, an air shut-off body 82 is made to have air holes 83, 83, . . . provided for the purpose of allowing air bubbles to pass upwards during the aeration. The air shut-off body is for the purpose of preventing oil floating on the top layer from being hardened by oxidization and easily facilitating the decomposition by oil and fat decomposition bacteria.

EFFECTS OF THE INVENTION

Since conventional purifying devices are constructed so that the quantity of water matching the quantity of miscellaneous drain water newly entering a purifying device is transferred to tanks which respectively carry out the next purification process, decomposition in the aeration treatment etc can be, as a prerequisite of the device, carried out for purification within the average dwell time of miscellaneous drain water, and time-consuming sludge decomposition could not be carried out. Therefore, sludge separated in the separator tank, used to be required to be periodically removed and subjected to a separate treatment before such a situation as the purification capacity of the aeration tank is exceeded by the transfer of flowing miscellaneous drain water due to swirl-up thereof, into an aeration treatment tank to cause the state of purifying capacity of aeration tank to be exceeded. In contrast, in the device of the present invention, sludge removal treatment in the separator tank will be almost unnecessary, thereby causing the maintenance and control to be extremely easy, and at the same time decreasing the burden of public utility sewage treatment facilities conventionally treating removed sludge to a large extent. Also, if sludge is transferred at every comparatively short intervals, a smaller aeration tank than conventional ones can be made to serve the purpose. Therefore, small-sizedness of the device can be achieved.

What is claimed is:

1. A drain water purifying method wherein a plurality of separator tanks, each comprising a vessel having a drain water inlet port and flow outlet port equipped with a means for retaining floating substances and settled sludge are installed in parallel, the respective flow inlet ports of the plurality of separator tanks being connected to a drain water source and the respective flow outlet ports being connected to a decomposition tank equipped with an aeration device, the method comprising linking the inlet of one of said separator tanks to the drain water source and the outlet to the decomposition tank and carrying out a purifying treatment process comprising separation and aerobic decomposition in the linked separator and decomposition tank while disconnecting drain water flow to at least one other separator tank, and performing a decomposition treatment for sludge and floating substances retained in the disconnected separator tank.

2. A purifying method defined in claim 1, wherein the decomposition process in the disconnected separator tank is aerobic.

3. A purifying method defined in claim 1, wherein the decomposition process in the disconnected separator tank is anaerobic.

4. A drain water purifying device comprising a plurality of separator tanks each comprising a vessel having a drain water flow inlet port and a flow outlet port connected to a means for retaining floating substances and settled sludge wherein the respective flow inlet ports of each of the separator tanks are connected in parallel to a source of drain water and the respective flow outlet ports of each of the separator tanks are connected in parallel to a decomposition tank equipped with an aeration device, and further comprising means for shutting off drain water flow to each separator tank and means for decomposing sludge in each separator tank while the drain water flow is shut off.

5. A purifying device defined in claim 4, wherein the sludge decomposition means comprises an aeration means and aerobic bacteria or a water flow agitating means and anaerobic bacteria.

* * * * *